United States Patent [19]
Hayashi

[11] 4,209,669
[45] Jun. 24, 1980

[54] PICK-UP CARTRIDGE

[75] Inventor: Hideaki Hayashi, Mitaka, Japan

[73] Assignee: Nippon Columbia Kabushikikaisha, Tokyo, Japan

[21] Appl. No.: 972,047

[22] Filed: Dec. 21, 1978

[30] Foreign Application Priority Data

Dec. 23, 1977 [JP] Japan .......................... 52-174294[U]

[51] Int. Cl.[2] ........................ H04R 11/12; G11B 3/02

[52] U.S. Cl. ................. 179/100.41 M; 179/100.41 K; 274/37

[58] Field of Search ............ 179/100.41 M, 100.41 K; 274/37

[56] References Cited

U.S. PATENT DOCUMENTS

| | | | |
|---|---|---|---|
| 3,694,586 | 9/1972 | Grado | 179/100.41 K |
| 3,699,268 | 10/1972 | Miller | 179/100.41 K |
| 3,763,335 | 10/1973 | Morita | 179/100.41 M |
| 3,992,017 | 11/1976 | Mori et al. | 179/100.41 M |
| 4,054,758 | 10/1977 | Fidi | 179/100.41 M |

*Primary Examiner*—Daryl W. Cook
*Attorney, Agent, or Firm*—Eyre, Mann, Lucas & Just

[57] ABSTRACT

A moving magnet type pick-up cartridge is disclosed. Coils arranged around a moving magnet have no yoke to prevent the generation of distortion by a yoke.

9 Claims, 15 Drawing Figures

PICK-UP CARTRIDGE

BACKGROUND OF THE INVENTION

1. Field of the Invention

The present invention relates generally to a pick-up cartridge, and is directed more particularly to a moving magnet type pick-up cartridge in which around a moving magnet there are located coils without any yoke, preferably hollow coils, so that when the magnet is subjected to a movement or vibration, an electromotive force is generated in the hollow coils without any magnetic distortion by the yoke.

2. Description of the Prior Art

As shown in FIG. 1, a prior art moving magnet type cartridge consists of a cantilever 1, a stylus 2 attached to one end of the cantilever 1 and a magnet 3 attached to the other end of the cantilever 1. When the cantilever 1 and hence the magnet 3 is moved or vibrated in accordance with the sound groove of a record disc, the magnetic field originated from the magnet 3 is changed. This change of the magnetic field is introduced to a yoke 4 and picked up by a coil 5 wound on the yoke 4 from which an output signal is derived. Since the yoke 4 passes through the coil 5, the characteristics of the prior art moving magnet type cartridge become such that the magnetic permeability of the yoke 4 is varied in response to the magnetic field to cause distortion and that as the frequency becomes high an eddy current is generated in the yoke 4 to lower the output signal in a high frequency band. Further, since the coil 5 is wound on the yoke 4, the output impedance increases. Thus, the reproduction characteristic is varied by the influence of a load impedance. While, in the case of a moving coil type pick-up cartridge, since its coil is vibrated in the parallel magnetic field, the above defect of the moving magneti type pick-up cartridge is not caused. However, since in the moving coil type pick-up cartridge its coil is wound on the vibrating system, it is difficult to manufacture the same, its equivalent mass increases and it is also difficult to exchange the respro-ducing stylus and so on.

OBJECTS AND SUMMARY OF THE INVENTION

Accordingly, an object of the present invention is to provide a moving magnet type pick-up cartridge which is free from the drawback inherent to the prior art moving coil type pick-up but has the advantage inherent thereto.

Another object of the invention is to provide a pick-up cartridge, in which coils are disposed around a magnet attached to the terminal end of a cantilever, a magnet or armature is moved relative to the coils, and the magnetic flux originated from the armature are varied and crossed by the coils to generate an electro-motive force with no yoke, so that the reproduced signal is free from magnetic distortion by the yoke.

A further object of the invention is to provide a pick-up cartridge in which a vibrating system including a stylus, a magnet and a cantilever can be easily exchanged.

A further object of the invention is to provide a pick-up cartridge in which coils are wound around a magnet in a cross-type.

A yet further object of the invention is to provide a pick-up cartridge in which hollow coils of O-shape are disposed near a magnet.

A still further object of the invention is to provide a pick-up cartridge in which a magnet is disposed in V-shape with respect to the axial direction of a cantilever and coils, each being wound in O-shape, are located near the magnet.

According to an aspect of the present invention there is provided a pick-up cartridge which comprises a cantilever having a stylus at its one end and a magnet at the other end, the magnet being magnetized in the axial direction of the cantilever, the cantilever, the stylus and the magnet forming a vibrating system, a frame made of non-magnetic material, and a coil fixed to the frame, the frame being so located that when the magnet is moved the coil intersects a closed magnetic flux originated from the magnet.

The other objects, features and advantages of the present invention will become apparent from the following description taken in conjunction with the accompanying drawings through which the like reference numerals designate the same elements.

DESCRIPTION OF THE PREFERRED EMBODIMENTS

The present invention will be hereinafter described with reference to the attached drawings.

Figure 1:
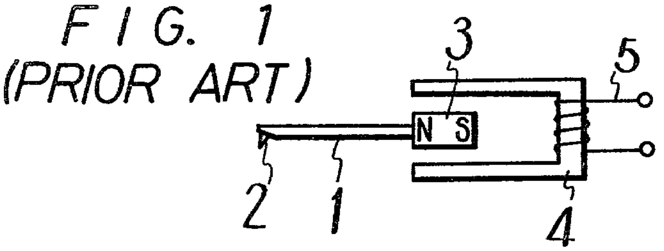
FIG. 1 (PRIOR ART)
FIG. 1 is a schematic diagram showing a prior art moving magnet type pick-up cartridge.
Figure 2A:
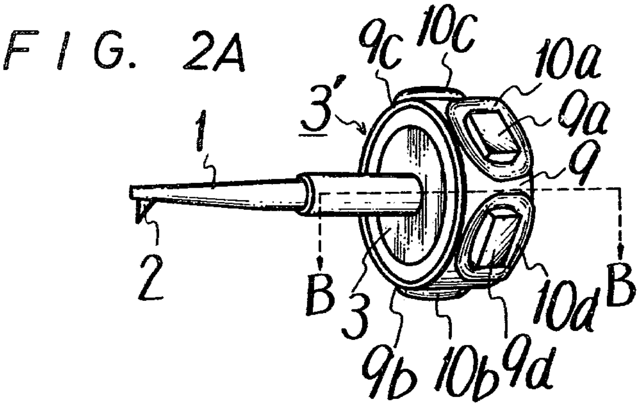
FIG. 2A is a perspective view showing an example of a pick-up cartridge, especially the vibrating system thereof according to the present invention.
Figure 2B:
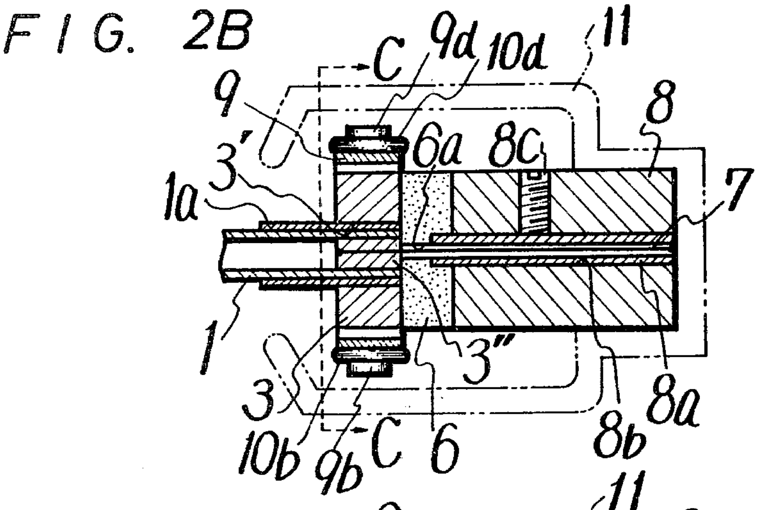
FIG. 2B is an enlarged cross-sectional view taken along the line B—B in FIG. 2A.
Figure 2C:
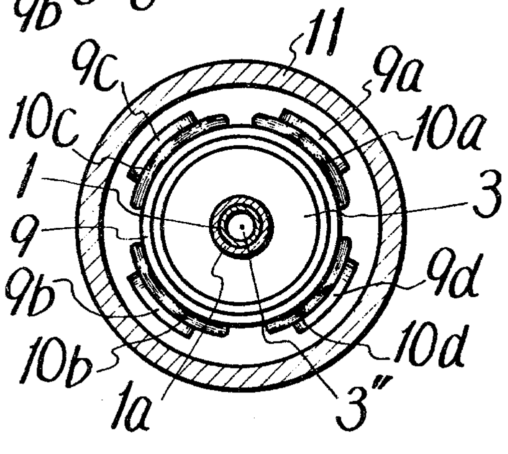
FIG. 2C is a cross-sectional view taken along the line C—C in FIG. 2B.

Turning to FIGS. 2A to 2C which show an example of the pick-up cartridge according to the present invention, a cantilever 1 has a stylus 2 attached to its one end and a magnet 3 attached to the other end therof to form a vibrating system. This vibrating system is coupled through a damper 6 to a fixed member 8 by a tension or suspension wire 7. That is, as clearly shown in FIG. 2B, the base end portion of the cantilever 1 partially covered by a reinforcing pipe *1a* is inserted into a central bore 3' of the magnet or armature 3 and fixed thereto, a collar 3" is inserted into the base portion of the cantilever 1, a sleeve *8a* is inserted into a center bore *8b* of the fixed member 8, then the sleeve *8a* is fixed to the fixed member 8 in its bore 8b by a set screw 8c, and the armature 3 having the cantilever 1 is coupled to the fixed member 8 through the damper 6 by the tension wire 7 in such a manner that one end of the wire 7 is fixed to the collar 3" within the cantilever 1 while the other end of the wire 7, which passes through the center bore 6a of the damper 6 and the sleeve 8a, is fixed to the end of the sleeve 8a. The magnet or armature 3 of the vibrating system is surrounded by a cylindrical frame 9 made of non-magnetic material, which is held by a casing 11 (not shown in FIG. 2A) of the cartridge. In this example, the fixed member 8 is fixed to the casing 11. Coils 10a, 10b, 10c and 10d, each being of O-shape, are wound on rectangular projections 9a, 9b, 9c and 9d of the frame 9, respectively, to be 45°—45° for the stylus 2. The coils 10a, 10b and 10c, 10d, each opposing in 45° direction, produce a stereophonic signal.

Figure 3A:
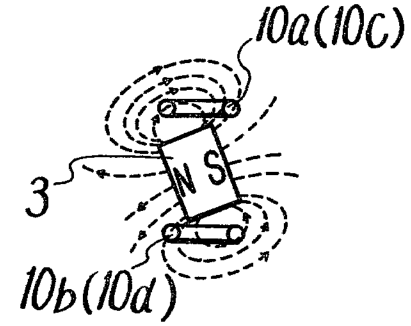
FIGS. 3A, 3B, 3C and 3D are schematic diagrams used for explaining the operation theory of the invention.
Figure 3B:
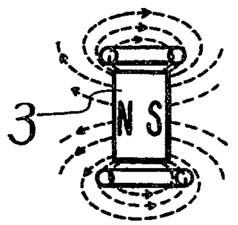
Figure 3C:
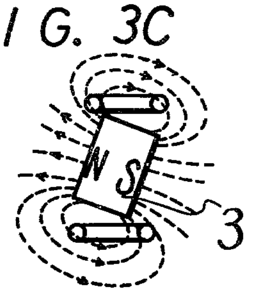

The electro-motive force generating theory of the example of the invention shown in FIGS. 2A, 2B and 2C will be now described with reference to FIGS. 3A to 3C. Now, if the pick-up cartridge is changed in state from that shown in FIG. 3B, in which the stylus 2 attached to the cantilever 1 is not vibrated, to the state shown in FIG. 3A or 3C, in which the stylus 2 is vibrated and hence the armature or magnet 3 magnetized in the axial direction of the cantilever 1 is moved or vibrated, the magnetic flux originated from the magnet 3 passing through the coils 10a, 10c or 10b, 10d is varied by the movement or vibration of the magnet 3. In this case, FIG. 3B shows the neutral state, while FIGS. 3A and 3C show opposite moving states with respect to the state of FIG. 3B and cause a so-called push-pull effect. When the magnetic fluxes passing through the coils 10a to 10d vary, electrical outputs corresponding to the variation can be generated and derived from the coils.

In the above example of the invention, the magnetic flux originated from the moveing armature 3 intersects the coils, which however is substantially same as the case where moving coils intersect the magnetic flux.

In a general moving coil type pick-up, the coil itself moves. Therefore, it is necessary to make its vibrating system compact and light, so that the winding number of the coils is limited. However, such a limitation is of no need in the invention, so that the invention is advantageous on this point.

In the above example, if whole the coils are covered with a soft magnetic material which also serves as a shield, the magnetic flux can be applied to the coils more effectively without being scattered.

Figure 4:
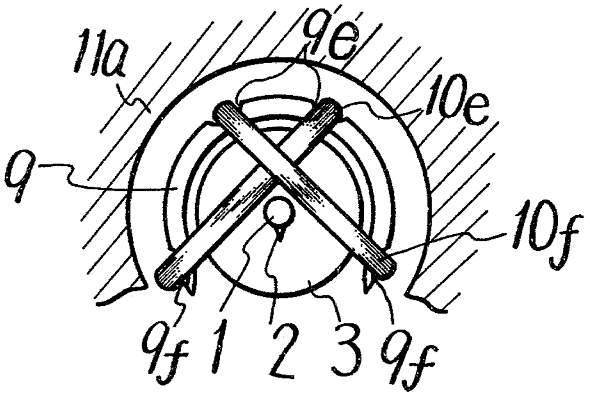
FIG. 4 is a front view showing another example of the invention.

FIG. 4 shows a second example of the present invention. In this example, the frame 9 is formed of a semicylindrical member which is sustantially U-shape in cross-section, concave portions 9e and 9f are provided on the outer periphery of the semi-cylindrical frame 9, and coils 10e and 10f, each being wound in O-shape, are wound on the concave portions 9e and 9f in cross-shape. Then, the vibrating system including the armature 3 and so on is inserted into the semi-cylindrical frame 9 from the under side thereof. Then, whole the apparatus is covered with a shielding case 11a.

Figure 3D:
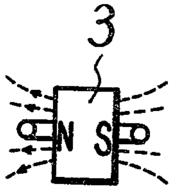
Figure 5A:
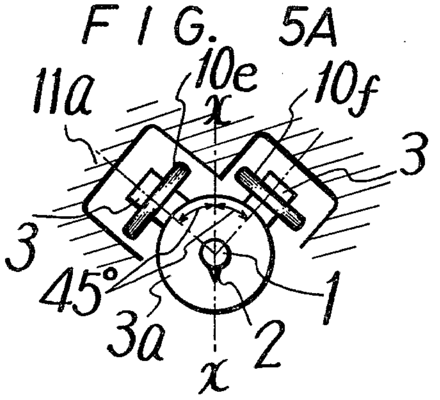
FIG. 5A is a front view showing a further example of the invention.
Figure 5B:
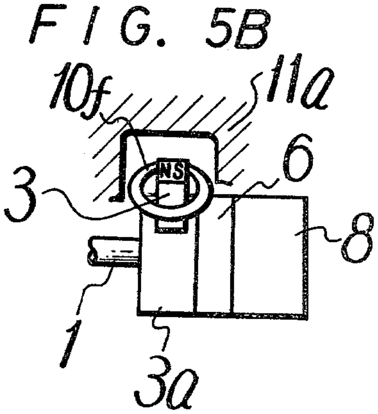
FIG. 5B is a side view of the example shown in FIG. 5A.

FIGS. 5A and 5B are front and side views of another example of the invention. In this example, a disc 3a made of synthetic resin or the like is attached to the end of the cantilever 1 opposite to the end to which the stylus 2 is attached, armatures or magnets 3, 3 are attached to the disc 3a in the radial directions thereof with the angle of 45° with respect to a radial direction x—x of the disc 3a passing through the center thereof, and coils 10e and 10f, each being wound in O-shape, are inserted into the armatures 3, 3, respectively. As shown in FIG. 5B, the armatures 3, 3 are magnetized N and S in the axial direction of the cantilever 1. The distribution of the magnetic flux of this example is shown in FIG. 3D.

Figure 6:
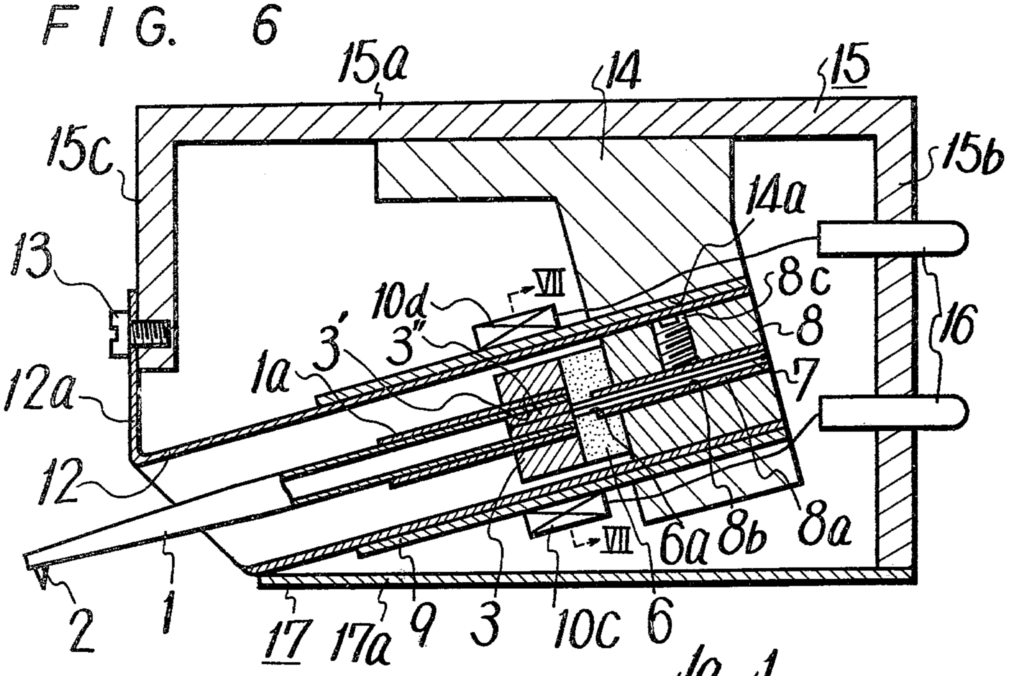
FIG. 6 is a side cross-sectional view showing a still further example of the invention.
Figure 7:
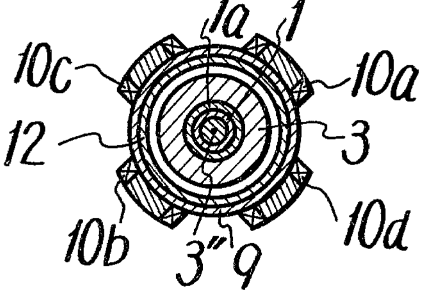
FIG. 7 is a cross-sectional view taken along the line VII—VII in FIG. 6 and seen to the arrows thereof.

FIG. 6 is a side cross-sectional view showing an example of the pick-up cartridge of the invention in which a vibrating system similar to the vibrating system of the invention shown in FIG. 2 is used so that the parts corresponding to those of FIG. 2 are marked with the same reference numerals and their detailed description will be omitted. FIG. 7 is a cross-sectional view taken on the line VII—VII in FIG. 6. In the example of FIGS. 6 and 7, the vibrating system consisting of the cantilever 1, stylus 2 and armature 3 is attached to the fixed member 8 through the damper 6 by the tension wire 7 to be freely movable or vibratable. The fixed member 8 is fixed to the inside of a cylindrical sleeve 12 made of metal. The frame 9, which is made of a synthetic resin cylinder and has on the outside thereof the coils 10a to 10d, each being wound in O-shape, is fixed to the outside of the metal sleeve 12 such that the coils 10a to 10d oppose the armature 3 through the frame 9 and sleeve 12. A support member 14 made of synthelic resin in the shape of substantiall L is provided which has bored therethrough at its lower end portion an aperture 14a. The frame 9 attached to the sleeve 12 is inserted into the aperture 14a and then fixed thereto. Thus, the vibrating system or cantilever 1 and armature 3 are supported in Ortofon type. The upper end of the support member 14 is attached to the inside of an upper plate member 15a of a cartridge casing 15 made of synthetic resin, so that the frame 9 with the sleeve 12, the vibrating system and so on are located inside the casing 15. Output terminals 16, 16 connected to the coils 10a to 10d are provided on a rear wall member 15b of the casing 15. The free end or opening of the metal sleeve 12, through which the cantilever 1 passes, is supported by a thin plate member 17a of an U-shaped cover 17 made of shielding material such as metal which fixed to the casing 15. A tongue 12a is attached at one end to a wall 15c of the casing 15 by a set screw 13 and at the other end to the sleeve 12. In this example, as shown in FIG. 7, each of the coils 10a to 10f is wound substantially in O-shape and attached to the outer periphery of the cylindrical frame 9 along its circle with the angular distance of 90° between adjacent ones in opposed relation to the armature 3 through the frame 9 and sleeve 12.

Figure 8A:
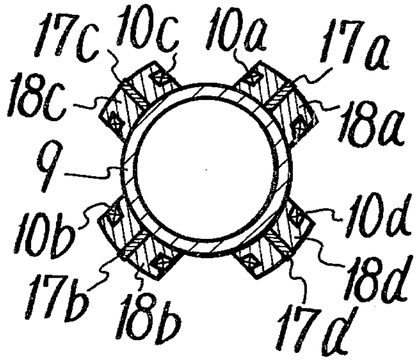
FIGS. 8A and 8B are, respectively, cross-sectional views showing parts of different examples of the invention similar to that shown in FIG. 7.
Figure 8B:
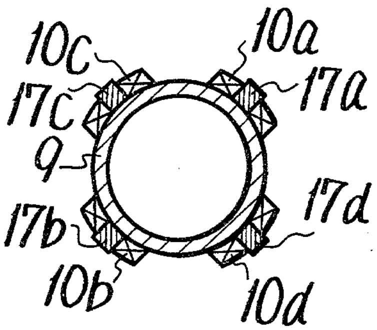

FIGS. 8A and 8B are cross-sectional views similar to FIG. 7 showing other examples of the invention.

In the example of FIG. 8A, pins 17a, 17b, 17c and 17d, each being made of synthetic resin, are planted on the outer periphery of the cylindrical frame 9 at positions with the angular distance of 90° between the adjacent ones, and bobbins 18a, 18b, 18c and 18d, each having a bore with the inner diameter substantially coincident with the outer diameter of each of the pins 17a to 17d, is engaged with the pins 17a to 17d, respectively. Then, the coils 10a to 10d are wound on the bobbins 18a to 18d, respectively. The other construction of this example is substantially same as that of FIG. 7.

In the example of FIG. 8B, the coils 10a to 10d, each being formed as a hollow coil, are supported by the pins 17a to 17d directly or without the bobbins 18a to 18d used in the example of FIG. 8A. The other construction of this example is substantially same as that of FIG. 7.

According to the pick-up cartridge of the present invention, it is constructed as above, so that its vibrating system including the stylus 2 and so on can be easily exchanged.

Further, although the present invention is of the moving magnet type, it does not contain a magnetic core. Therefore, no increase of output impedance occurs in the invention, the distortion by the magnetic characteristic of the magnetic core can be reduced or avoided and advantages similar to the moving coil type can be pertained to the present invention.

Further, the present invention is superior in manufacturing, practical use and property points of view.

It will be apparent that many modifications and variations could be effected by one skilled in the art without departing from the spirits or scope of the novel concepts of the present invention, so that the spirtis or scope of the invention should be determined by the appended claims only.

I claim as my invention:

1. A pick-up cartridge comprising:

(a) a cantilever having a stylus at its one end and a magnet at its other end, said magnet being magnetized in the axial direction of said cantilever, said cantilever, said stylus and said magnet forming a vibrating system;

(b) a frame made of non-magnetic material; and (c) a coil fixed to said frame, said frame being so located that when said magnet is moved said coil intersects a closed magnetic flux originated from said magnet.

2. A pick-up cartridge as claimed in claim 1, in which said magnet is a disc and said frame is made of a cylinder which is disposed coaxial with said magnet.

3. A pick-up cartridge as claimed in claim 1, in which said frame having said coil wound thereon is made of a semi-cylinder and said vibrating system is inserted into said semi-cylindrical frame.

4. A pick-up cartridge as claimed in claim 3, in which said coil is wound on said cylindrical frame in cross-shape.

5. A pick-up cartridge as claimed in claim 2, in which said cylindrical frame has provided with a portion on which said coil is wound.

6. A pick-up cartridge as claimed in claim 2, in which said coil is made of a hollow coil and said hollow coil is fixed to said cylindrical frame.

7. A pick-up cartridge as claimed in claim 2, in which a pin is planted on said cylindrical frame and said coil is made of a hollow coil, said hollow coil being supported by said pin.

8. A pick-up cartridge as claimed in claim 2, in which a pin is planted on said cylindrical frame, a bobbin is engaged with said pin, and said coil is wound on said bobbin.

9. A pick-up cartridge as claimed in claim 1, in which a disc is attached to the other end of said cantilever, and said magnet is attached to said disc in cross-shape.

* * * * *